United States Patent
Greenberg et al.

[11] Patent Number: 5,910,514
[45] Date of Patent: Jun. 8, 1999

[54] SYNTHETIC MULCH

[76] Inventors: Lee M. Greenberg, 12058 Craigview, Creve Coeur, Mo. 63146; Judy A. Smith, 5880 Waterman, 1 South, St. Louis, Mo. 63112

[21] Appl. No.: 08/953,824

[22] Filed: Oct. 1, 1997

[51] Int. Cl.⁶ .............. C08J 11/04; A01G 13/02
[52] U.S. Cl. .................. 521/40.5; 521/41; 521/43.5; 47/9
[58] Field of Search ............ 521/40.5, 41, 43.5; 47/9

[56] References Cited

U.S. PATENT DOCUMENTS

| | | | |
|---|---|---|---|
| 5,105,577 | 4/1992 | Hedges | 428/15 |
| 5,330,804 | 7/1994 | Allison et al. | 428/15 |
| 5,389,116 | 2/1995 | Byrd | 47/58 |
| 5,396,731 | 3/1995 | Byrne | 47/25 |
| 5,585,150 | 12/1996 | Sheehan | 428/15 |

*Primary Examiner*—James J. Seidleck
*Assistant Examiner*—Olga Asinovsky
*Attorney, Agent, or Firm*—Haverstock, Garrett & Roberts

[57] ABSTRACT

The present invention relates to synthetic wood chips and methods for making the same. The synthetic wood chips are made from rubber particles, such as ground up tires, and a colorant which colors the rubber particles to look like natural mulch. The synthetic mulch is available in a wide variety of shapes and sizes, however, it is preferred for the synthetic mulch to look like wood chips, tree bark, or pea gravel.

8 Claims, 1 Drawing Sheet

SYNTHETIC MULCH

FIELD OF INVENTION

The present invention relates to a synthetic mulch material which is designed, dimensioned, and colored to look like natural mulch, and a method for making the synthetic mulch material. More specifically, the synthetic mulch material is made of rubber and is colored and textured to look like any of a variety of natural mulches.

BACKGROUND OF INVENTION

Mulch is a protective covering material that is typically placed on top of soil and which is used in association with ornamental lawns and gardens. Often the mulch material is placed around trees, shrubs, and bushes to give a pleasing appearance and to prevent the evaporation of water from around the trees, shrubs, or bushes. In general mulch is any of a variety of materials which are used to prevent evaporation of water, protect roots from freezing, and retard the growth of weeds. The mulch material retards the growth of weeds by preventing sunlight from reaching the surface of the ground, which prevents the growth of many plants. Also, the mulch forms a barrier many plant species cannot penetrate. Freezing of roots is prevented because the mulch functions similar to insulation. The mulch prevents evaporation by preventing the surface from being directly contacted by sunlight.

Mulch materials have traditionally been natural materials, such as hay, wood chips, bark, rocks, pea gravel, leaves, and other similar natural plant and mineral. The natural mulch material has generally been effective in preventing evaporation and retarding the growth of some weeds. Natural mulches have further been used because they are attractive and blend in well with natural landscapes. Thus, natural mulches enhance the appearance of a landscape or an ornamental lawn, while functionally preventing evaporation of water and preventing the growth of some weeds. In addition to being functional and attractive, natural mulches are used because they are readily available. Typically, natural mulches are derived from left over plant and mineral materials which have few other uses beyond mulch, consequently natural mulches are further desirable because they are an effective way to usefully dispose of waste plant and mineral materials.

While natural mulches have a number of useful properties, they suffer from a number of drawbacks. One of the primary drawbacks is that natural mulch allows for the growth of too many undesirable plants or weeds, as natural mulch typically does not sufficiently cover an area in a way to prevent the growth of weeds. Also, natural mulch tends to break-down or decompose, meaning it may have a short use life. The decomposition of the natural mulch may also result in offensive odors. Further, some natural mulches tend to dissipate from the areas where they were placed as a result of wind or water runoff carrying the mulch away, as many natural mulches do not have a high specific gravity. Natural mulches are also undesirable because they attract insects.

In response to the problems associated with natural mulches a variety of synthetic mulches and similar products have been developed. One such mulch is made from plastic materials, such as thermoplastics which are typically used to form hard plastic objects such as milk jugs, boat hulls, and pipes. The use of a thermoplastic in the construction of a synthetic mulch, however, suffers from a number of disadvantages. Thermoplastics are not easily colored to look like natural mulches, which is preferred, thus the user of a thermoplastic mulch typically has a limited number of colors to pick from. Also, the thermoplastic mulches do not look realistic or natural, instead they have an artificial look. Mulches made of thermoplastics also suffer because they are generally hard and may have sharp edges. It is known that most thermoplastics are rigid, hard materials so that when a synthetic mulch is made from the thermoplastic material the resulting mulch will provide very little cushioning. This is undesirable because frequently synthetic mulch is placed on areas where children play. Thus, it would be desirable to have a synthetic mulch which has all the characteristics of a natural mulch, but which does not break down, and which is soft and can be easily colored.

SUMMARY

The present invention relates to rubber materials which are colored and textured and which have a diameter equal to at least 1/16 inches. The surface of the rubber materials is embossed, so that the surface will have ridges and valleys which will give the materials a rough feel. The colored textured rubber materials can be used for a variety of different applications including use as a mulch or as a playground surface.

Preferably, the present invention relates to a synthetic mulch, methods for making the synthetic mulch, and uses of rubber and colorants to make synthetic mulch. The synthetic mulch of the present invention is comprised of rubber particles and acrylic colorants. Rubber particles are preferred because rubber allows for a mulch that yields when impacted, does not have sharp edges, retains an amount of water in the soil covered by the mulch, prevents the growth of weeds, is non-toxic, does not emit offensive odors, is long lasting and does not break down easily, and can be easily colored to produce synthetic mulches of a variety of different colors. The colorant used to color the rubber particles can be any acrylic colorant, with water based acrylic colorants being the most preferred.

The rubber particles are selected from a variety of rubber materials, including rubber materials which are selected from the group consisting of natural polymers and synthetic high polymers which are cross linked and are thermosets. Generally, the rubber particles are derived from polymeric materials such as waste rubber buffings and ground truck tires. It is most preferred for the rubber particles to be vulcanized rubber. Once the rubber particles are selected and ground to a sufficient size, shape, and texture, the particles are mixed with a colorant system. The synthetic mulch is made by sufficiently mixing the rubber particles with the colorant system so as to adequately color the rubber particles with the colorant. The mulch chips which make up the synthetic mulch are formed in a variety of sizes and textures, so that the mulch chips may have a smooth texture or a rough texture and a diameter equal to at least 1/16 of an inch. Because, the color, texture, and size can be varied, the synthetic mulch of the present invention can be made to look like a variety of different natural mulches.

The natural mulches which can be simulated by the synthetic mulch includes, but are not limited to, wood chips, tree bark, and pea gravel. The most preferred synthetic mulch is designed and dimensioned to look like ground wood chips. Thus, the present synthetic mulch is especially advantageous because it can be designed, dimensioned, and colored to look like a natural mulch, without the disadvantages associated with natural mulches. The present synthetic mulch is also advantageous because it can be readily textured, unlike other synthetic mulches, and is available in a variety of colors; use of rubber allows for a wider variety of textures than synthetic mulches made from thermoplastics.

The synthetic mulch chips are also advantageous because they can be used to stifle weed growth and form a surface that is softer than the ground. Also, unlike other synthetic mulches the present invention does not have sharp edges. The present synthetic mulch is further preferred over other synthetic mulches because it is available in a variety of different colors and looks more like a natural mulch. Finally, using old tires to form the synthetic mulch chips is a desirable way to dispose of the old tires.

DETAILED DESCRIPTION

In accordance with the preferred invention a synthetic mulch is provided which is shaped and sized to look like a natural mulch, as well as, a method for making the synthetic mulch. The synthetic mulch is especially desirable because it is designed and dimensioned to look like natural mulch so that it has an attractive appearance. The synthetic mulch is also desirable because it functionally holds moisture in soil covered by the mulch, prevents weed growth, is not hazardous, does not attract insects, and provides protection for roots. The use of rubber to form the synthetic mulch is especially important because the rubber, unlike other synthetic materials, is easily colored, can be cut and shaped to look like a variety of different mulches, is non-toxic, is not hard and does not have sharp edges, can be readily textured to initiate a variety of different natural mulches, and appears to hold more water than other types of synthetic materials, such as plastic. In addition to being made of rubber, the present synthetic mulch includes an amount of water based acrylic colorant which is especially desirable for use with the rubber chips because a synthetic mulch is formed which has a natural look and which does not lose its coloration with the passage of time.

Figure 1:
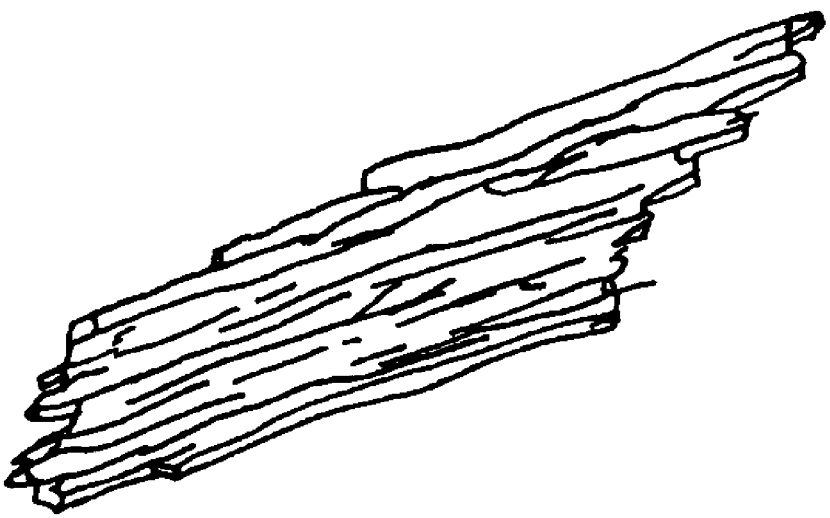
FIG. 1 is a cross-sectional view of a synthetic wood chip designed to look like natural ground wood chip mulch; and, FIG. 2 is a cross-sectional view of a synthetic wood chip designed to look like natural pea gravel mulch.
Figure 2:
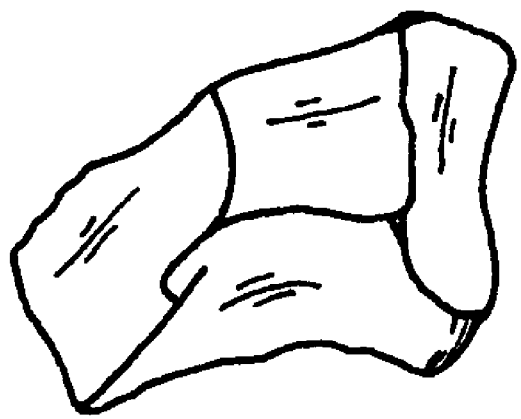

The synthetic mulch is made by coloring the surface of a plurality of rubber particles with a water based acrylic colorant. As mentioned, rubber is crucial to the present invention because of the unique and desirable characteristics imparted by rubber and because of its ease of use. The rubber particles used may be of a variety of sizes, shapes, and texture. Beneficially, the rubber particles can be cut or shredded to resemble tree bark (as shown in FIG. 1), wood chips, pea gravel (as shown in FIG. 2), and a variety of other natural mulches, as the rubber particles can be textured in a variety of ways. The ability to contour the rubber particles means that the texture of the surface of the rubber particles can have a variety of constructions. The surface can be smooth with a few edges similar to pea gravel, FIG. 2, or rough like tree bark, FIG. 1, so that the surface has numerous ridges and valleys of differing heights and depths. Additionally, the texture can have only a few ridges on the surface texture resulting in a rubber particle having a surface similar to a wood chip.

The method for embossing or forming the surface of the rubber particles can involve any of a variety of methods. Generally, the surface of the rubber particles is formed by passing waste rubber from tire shavings or retread tires through a machine that cuts and contours the rubber particles. The waste rubber prior to formation into a chip generally is in large strips approximately six (6) inches wide and about six (6) inches long, so that the waste rubber is then passed through a machine or device which cuts the waste rubber into particles which have either a smooth or contoured surface and which have a variety of thicknesses and lengths. Preferably, the round rubber particles have a length ranging between about $\frac{1}{16}$ inches and about eight (8) inches and a width ranging between about $\frac{1}{16}$ inches and about two (2) inches. A variety of sizes can be used, however, dependent upon the specific natural mulch it is desired to imitate.

Rubber is the most preferred material for use in forming the synthetic mulch, because it can form a synthetic mulch which is easily colored, does not have sharp edges and is flexible so that it is somewhat soft, retains an amount of water, prevents the growth of weeds, does not attract insects, and does not emit any offensive odors. The rubber for use in forming the synthetic mulch is selected from the group consisting of natural and synthetic high polymers which are cross linked and are thermosets. The more preferred rubber particles are high polymers which have been vulcanized, examples include rubber buffings or ground rubber from truck retreads. Other rubber materials suitable for use in forming the synthetic mulch include ground automobile tires and truck tires.

Once the rubber particles are formed from the waste rubber material, the rubber is placed in means for mixing the rubber with a colorant. Any of a variety of mixing means can be used so long as the device chosen can adequately mix the rubber particles with colorant. Preferred mixing means include an agitating tank. After the rubber particles are placed in the mixing means an amount of colorant is added to the rubber particles in the mixing means. The amount of colorant added will be equal to between about 3% and about 10% by weight of the rubber particles. More preferably, the colorant is added in an amount equal to between about 3% and about 6% by weight of the rubber particles. The colorant can also be added according to volume, so that the colorant is added in an amount equal to from about 2% to about 10% by volume of the rubber particles. More preferably, the volume of colorant added to the rubber particles is equal to between about 2.5% and about 5% by volume of the rubber particles. Once the colorant is added, the colorant and rubber particles are thoroughly mixed so as to ensure that the particles are fully coated with the colorant and so that the synthetic mulch will be uniformly colored. Any mixing time is permissible so long as the surface of the rubber particles is uniformly colored to form the synthetic mulch. Also, any mixing speed can be used so long as the rubber particles are uniformly colored to form the synthetic mulch chips. Generally, the preferred mixing time is approximately one minute in a standard agitating tank. When the mixing between the colorant and the rubber particles is completed, colored synthetic mulch chips are formed which need to be dried so as to ensure that the colored synthetic mulch will retain its color when used. If complete drying of the synthetic mulch chips is not accomplished then the synthetic mulch will not hold its color. Also, drying is necessary so that the particles will not stick together to form clumps of attached particles. Typically, it takes between five (5) minutes and two (2) hours to complete the drying step, which is accomplished in drying means, such as a fluid bed dryer. The drying means can be any of a variety of devices, however. It is suitable to simply allow the mulch chips to air dry at room temperature.

The colorant used to color the rubber particles, shreds, granules, and/or chips can be selected from a variety of different coloring systems, as long as the colorant is available in at least earth tone colors, readily adheres to rubber, and does not wash off the rubber when contacted by water. The most preferred colorants are water based acrylic systems such as the colorant systems sold under the name "VISICHROME", by Futura Coatings, Inc. of Hazlewood, Mo. The water acrylic based acrylic colorant systems are preferred because not only are they available in earth tone colors, but they are available in a variety of colors. Further, not only can water based acrylic colorant systems be used, but other acrylic colorants can be used as long as the colorants remain on the synthetic mulch when exposed to the elements and as long the mulch is suitably colored.

Once formed the synthetic mulch is then placed around bushes and trees or used as edging to enhance the appearance of a lawn. As mentioned, the synthetic mulch will protect certain plants, such as trees and bushes, and keep undesirable plants, like weeds from growing. The synthetic mulch can also be used as a play surface or for any surface which requires a surface that is somewhat soft. Additionally, the synthetic mulch is desirable because it can be colored so that the surface is of a color desirable to the user.

EXAMPLE

An amount of synthetic mulch for use on an ornamental lawn was prepared by placing in a five (5) gallon stainless steel bucket an amount of colorant and rubber particles. The rubber particles are known as rubber buffings and were derived from tire retreads. The rubber particles had a length ranging between about $1/8$ of an inch and about three (3) inches and a width ranging between about $1/4$ of an inch and about $3/4$ of an inch. The rubber particles were added to the bucket in an amount equal to 40 cups.

After the rubber particles were added to the stainless steel bucket an amount of colorant was then added to the rubber particles in the stainless steel bucket. The color added was cypress and is manufactured under the name "VISICHROME", and is made by Futura Coatings, Inc. of Hazlewood, Mo. The amount of colorant added to the stainless steel bucket was equal to one (1) cup or 2.5% by volume of the rubber particles.

Once the colorant and the rubber particles were added to the stainless steel bucket the two constituents were hand mixed for approximately two minutes, which was sufficient to thoroughly coat the rubber particles with the colorant. After mixing the colored rubber particles were removed from the stainless steel bucket and were spread out and allowed to air dry for two (2) hours. Upon completion of drying the synthetic mulch was formed and ready for use.

Thus, there has been shown and described a novel synthetic mulch, which fulfill all the objects and advantages sought therefore. It would be apparent to those skilled in the art, however, that many changes, variation, modification, and other uses and applications for the subject method and composition are possible, and also such changes, variations, modifications, and other uses and applications which do not depart from the spirit and scope of the invention are deemed to be covered by the invention which is limited only by the claims which follow.

What is claimed is:

1. A synthetic mulch material sized, shaped, and colored to imitate a natural mulch, wherein said synthetic mulch is comprised of:

a) a plurality of rubber particles, with the rubber selected from the group consisting of natural polymers and synthetic high polymers, with said rubber particles having an outer surface designed and dimensioned to look like natural mulch selected from the group consisting of pea gravel, wood chips, and tree bark, and a length ranging between about $1/16$ inch and about 8 inches and a width ranging between about $1/16$ inches and about 2 inches; and, b) an amount of water based acrylic colorant added in an amount equal to between about 3% and about 10% by weight of said rubber particles, with said colorant coating said rubber particles thereby forming said synthetic mulch.

2. The synthetic mulch of claim 1 wherein said rubber particles are preferably selected from the group consisting of waste rubber buffings and ground tires.

3. The synthetic mulch of claim 1 wherein said colorant is a water based acrylic called VISICHROME.

4. A method for forming a synthetic mulch sized, shaped, and colored to imitate a natural mulch, with said method for forming said synthetic mulch including the following steps:

a) shredding an amount of rubber to form a plurality of rubber particles ranging in size between about a quarter inch and about four inches;

b) adding an amount of water based acrylic colorant to said shredded rubber particles, so as to color said particles to look like natural mulch; and, c) thoroughly mixing said colorant and said rubber particles to form said colored synthetic mulch.

5. A method for using vulcanized rubber to form a synthetic mulch, wherein an amount of vulcanized rubber is shredded to create a plurality of rubber particles having an outer surface with a rough bark like texture and a length ranging between about $1/16$ inch and about 8 inches and a width ranging between about $1/16$ inches and about 2 inches, said shredded vulcanized rubber particles are then colored with an amount of colorant so as to form a plurality colored rubber particles which imitate natural mulch.

6. The method of claim 5 wherein said rubber particles are preferably selected from the group consisting of waste rubber buffings and ground tires.

7. The method of claim 5 wherein said colorant is a water based acrylic.

8. A colored textured material for use as an outdoor surface, wherein said material is comprised of:

a) a plurality of rubber particles, with the rubber selected from the group consisting of natural polymers and synthetic high polymers, with said rubber particles having an outer surface that is embossed and a length ranging between about $1/16$ inch and about 8 inches and a width ranging between about $1/16$ inches and about 2 inches; and, b) an amount of water based acrylic colorant added in an amount equal to between about 3% and about 10% by weight of said rubber chips, with said colorant coating said rubber particles thereby forming said colored textured material.

* * * * *